United States Patent
Kobayashi

(10) Patent No.: US 9,434,172 B2
(45) Date of Patent: Sep. 6, 2016

(54) LIQUID CARTRIDGE

(71) Applicant: BROTHER KOGYO KABUSHIKI KAISHA, Nagoya-shi, Aichi-ken (JP)

(72) Inventor: Tetsuro Kobayashi, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/520,491

(22) Filed: Oct. 22, 2014

(65) Prior Publication Data

US 2016/0059572 A1    Mar. 3, 2016

(30) Foreign Application Priority Data

Aug. 29, 2014   (EP) .................................... 14182935

(51) Int. Cl.
*B41J 2/175* (2006.01)
(52) U.S. Cl.
CPC ............ *B41J 2/17523* (2013.01); *B41J 2/1752* (2013.01); *B41J 2/17513* (2013.01); *B41J 2002/17576* (2013.01)
(58) Field of Classification Search
CPC .................. B41J 2/175; B41J 2/17503; B41J 2002/17576
See application file for complete search history.

(56) References Cited

U.S. PATENT DOCUMENTS

| | | |
|---|---|---|
| 4,862,192 A | 8/1989 | Slomianny |
| 9,150,011 B1 | 10/2015 | Tomoguchi et al. |
| 2003/0128256 A1 | 7/2003 | Oda et al. |
| 2005/0146579 A1* | 7/2005 | Sasaki ................. B41J 2/17513 347/86 |
| 2006/0290753 A1 | 12/2006 | Tatsumi et al. |
| 2007/0236549 A1 | 10/2007 | Yamada |
| 2008/0239033 A1 | 10/2008 | Hattori |
| 2009/0141095 A1 | 6/2009 | Umeda |
| 2010/0238241 A1 | 9/2010 | Sasaki |
| 2010/0245458 A1 | 9/2010 | Nakamura |
| 2012/0056954 A1 | 3/2012 | Asauchi et al. |
| 2012/0182365 A1 | 7/2012 | Ma |
| 2015/0298461 A1 | 10/2015 | Koganehira et al. |
| 2016/0059570 A1 | 3/2016 | Kobayashi |
| 2016/0059571 A1 | 3/2016 | Kobayashi |

FOREIGN PATENT DOCUMENTS

| | | |
|---|---|---|
| DE | 20 2008 018 473 U1 | 4/2014 |
| EP | 0282049 A2 | 9/1988 |
| EP | 0803364 A2 | 10/1997 |

(Continued)

OTHER PUBLICATIONS

Extended European Search Report issued in EP 14182935.8, mailed Feb. 12, 2015.

(Continued)

*Primary Examiner* — Geoffrey Mruk
(74) *Attorney, Agent, or Firm* — Merchant & Gould P.C.

(57) ABSTRACT

A liquid cartridge includes a first liquid chamber, a second liquid chamber, a communication path through which liquid can flow from the first liquid chamber to the second liquid chamber, a blocking member configured to block communication between the first liquid chamber and the second liquid chamber through the communication path, and a movable member positioned in the second liquid chamber and comprising a float. The first liquid chamber stores liquid therein and the second liquid chamber does not store liquid therein.

16 Claims, 11 Drawing Sheets

(56) References Cited

FOREIGN PATENT DOCUMENTS

| | | |
|---|---|---|
| EP | 1570995 A1 | 9/2005 |
| EP | 2039520 A1 | 3/2009 |
| EP | 2 174 788 A1 | 4/2010 |
| EP | 2 708 362 | 3/2014 |
| JP | 8-281966 A | 10/1996 |
| JP | 9-277560 A | 10/1997 |
| JP | 2008-254194 A | 10/2008 |
| WO | 2009/066612 A1 | 5/2009 |

OTHER PUBLICATIONS

Extended European Search Report issued in EP 14182931.7, mailed Feb. 12, 2015.
Extended European Search Report issued in EP 14182929.1, mailed Feb. 12, 2015.
U.S. Office Action issued in related U.S. Appl. No. 14/520,443, mailed Oct. 1, 2015.
U.S. Office Action issued in related U.S. Appl. No. 14/520,468, mailed Feb. 2, 2016.
Office Action from German Patent Application No. 10 2015 203 327.9, mailed Feb. 12, 2016.
Office Action from German Patent Application No. 10 2015 203 328.7, mailed Feb. 12, 2016.
Office Action from German Patent Application No. 10 2015 203 330.9, mailed Feb. 12, 2016.
U.S. Office Action issued in related U.S. Appl. No. 14/520,443, mailed Mar. 10, 2016.
U.S. Office Action (Notice of Allowance) issued in related U.S. Appl. No. 14/520,468, Jul. 1, 2016.

* cited by examiner

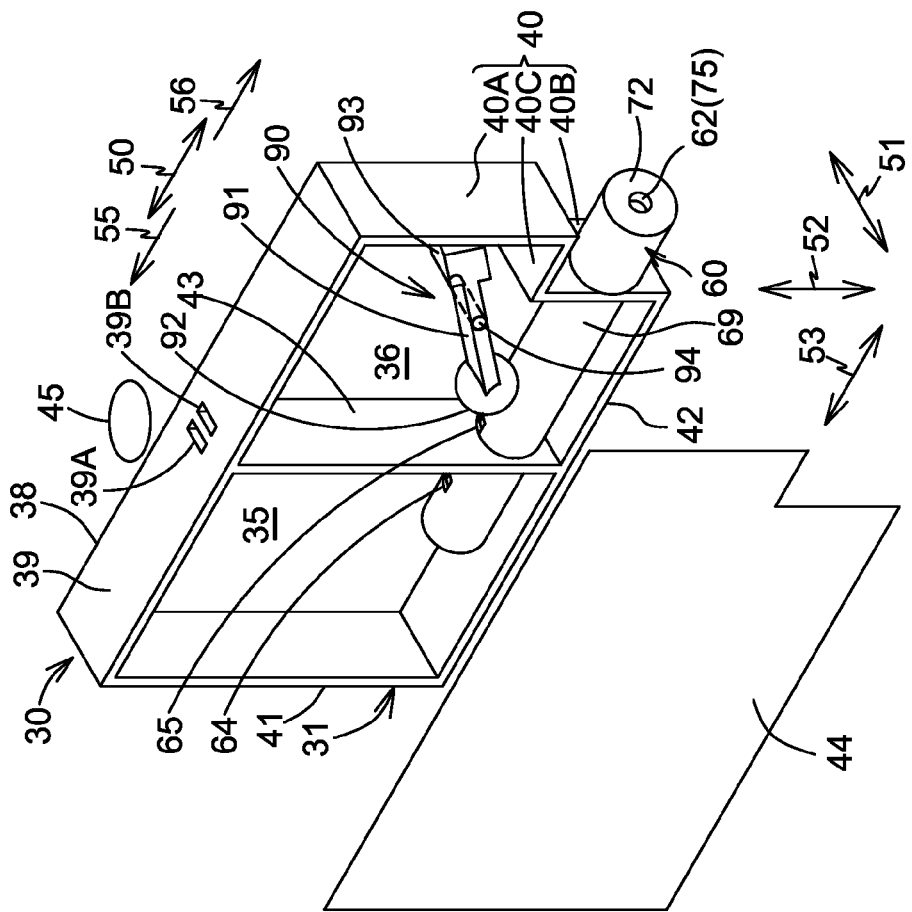
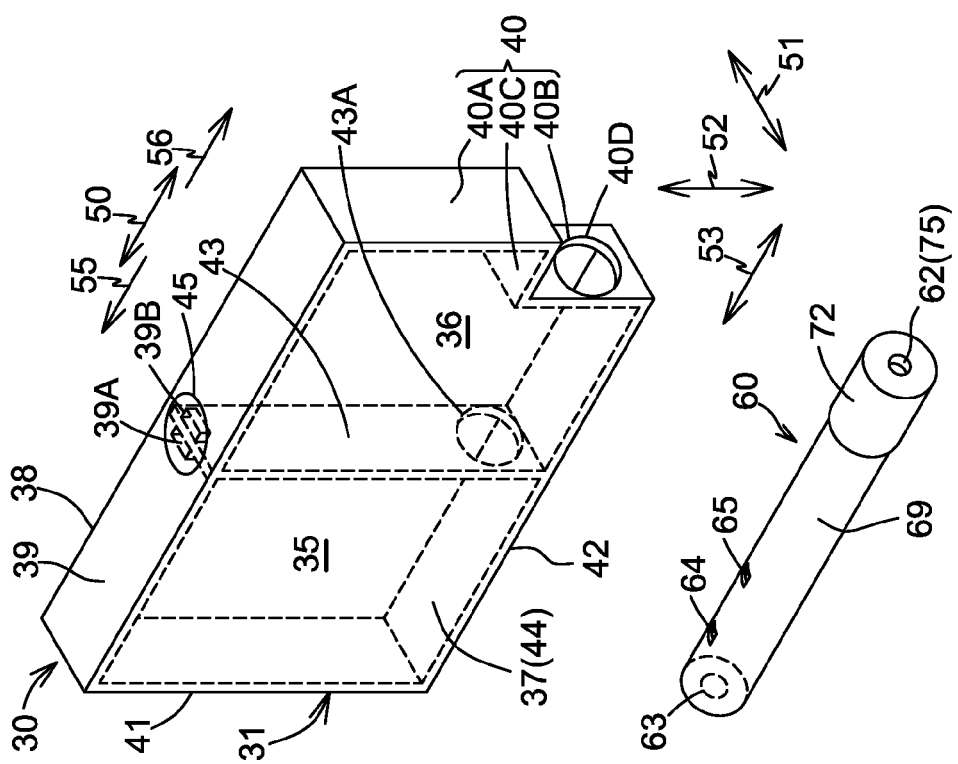
Fig.3B
Fig.3A

LIQUID CARTRIDGE

CROSS-REFERENCE TO RELATED APPLICATION

The present application claims priority to and the benefit of European Patent Application No. 14182935.8, which was filed on Aug. 29, 2014, the disclosure of which is incorporated herein by reference in its entirety.

BACKGROUND OF THE INVENTION

1. Field of the Invention

The present invention relates to a liquid cartridge.

2. Description of Related Art

A known cartridge is configured to store liquid therein and also is configured to supply the liquid to an exterior of the cartridge. When the cartridge is mounted to a liquid consuming apparatus, the liquid supplied from the liquid cartridge is consumed by the liquid consuming apparatus. There is a need for a user of the liquid consuming apparatus to know whether the liquid cartridge is empty or to know the amount of liquid in the liquid cartridge. For instance, known ink cartridges, as described in Patent Application Publication Nos. JP-2008-254194 A and JP-08-281966, are used with an inkjet printer and have a float that moves following the ink surface. By detecting the position of the float directly or indirectly, the printer tells a user whether the ink cartridge is empty or how much amount of ink is left in the ink cartridge.

More specifically, the ink cartridge of Patent Application Publication No. JP-2008-254194 A has a float supported by an arm. When the ink cartridge stores a sufficient amount of ink therein, the float is submerged in ink. When the amount of ink becomes small and the ink surface lowers, a part of the float is exposed from the ink surface. When the ink surface further lowers, the float moves down following the lowering ink surface. The ink cartridge of Patent Application Publication No. JP-08-281966 has a float which always float on ink. When the ink surface lowers, the float moves down following the lowering ink surface.

When such ink cartridges are transported, the ink cartridges receive vibration or shock, and air bubbles may be formed in ink in an ink chamber in which the float is provided. The air bubbles may adhere to the float and a wall surface of the ink chamber and thereby hinder the movement of the float.

SUMMARY OF THE INVENTION

Therefore, a need has arisen for a liquid cartridge which overcomes these and other shortcomings of the related art. A technical advantage of the present invention is that a float can move smoothly in a liquid cartridge.

According to an aspect of the present invention, a liquid cartridge comprises a liquid chamber; a liquid supply portion providing selective liquid communication between an interior of the liquid chamber and an exterior of the liquid chamber; a partitioning wall partitioning the liquid chamber into a first liquid chamber and a second liquid chamber; a communication path providing selective liquid communication between the first liquid chamber and the second liquid chamber; a blocking member having a block position in which liquid is prevented from flowing from the first liquid chamber to the second liquid chamber through the communication path, such that liquid is stored in the first liquid chamber and not stored in the second liquid chamber, wherein the liquid has a first specific gravity; and a first movable member positioned in the second liquid chamber and comprising a float, wherein the float has a second specific gravity which is less than the first specific gravity.

With this configuration, because the second liquid chamber does not store liquid before the blockage of the communication between the first liquid chamber and the second liquid chamber by the blocking member is released, air bubbles are not formed in the second liquid chamber. As a result, the first movable member comprising the float can move smoothly in the second liquid chamber after the liquid flows into the second liquid chamber from the first liquid chamber.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

FIG. 3A is a perspective view of the ink cartridge, in which a film is welded to a frame. FIG. 3B is an exploded perspective view of the ink cartridge, in which the film is removed from the frame.

DETAILED DESCRIPTION OF EMBODIMENTS OF THE INVENTION

Embodiments of the present invention, and their features and advantages, may be understood by referring to FIGS. 1-11B, like numerals being used for like corresponding parts in the various drawings.

[Printer 10]

Figure 1:
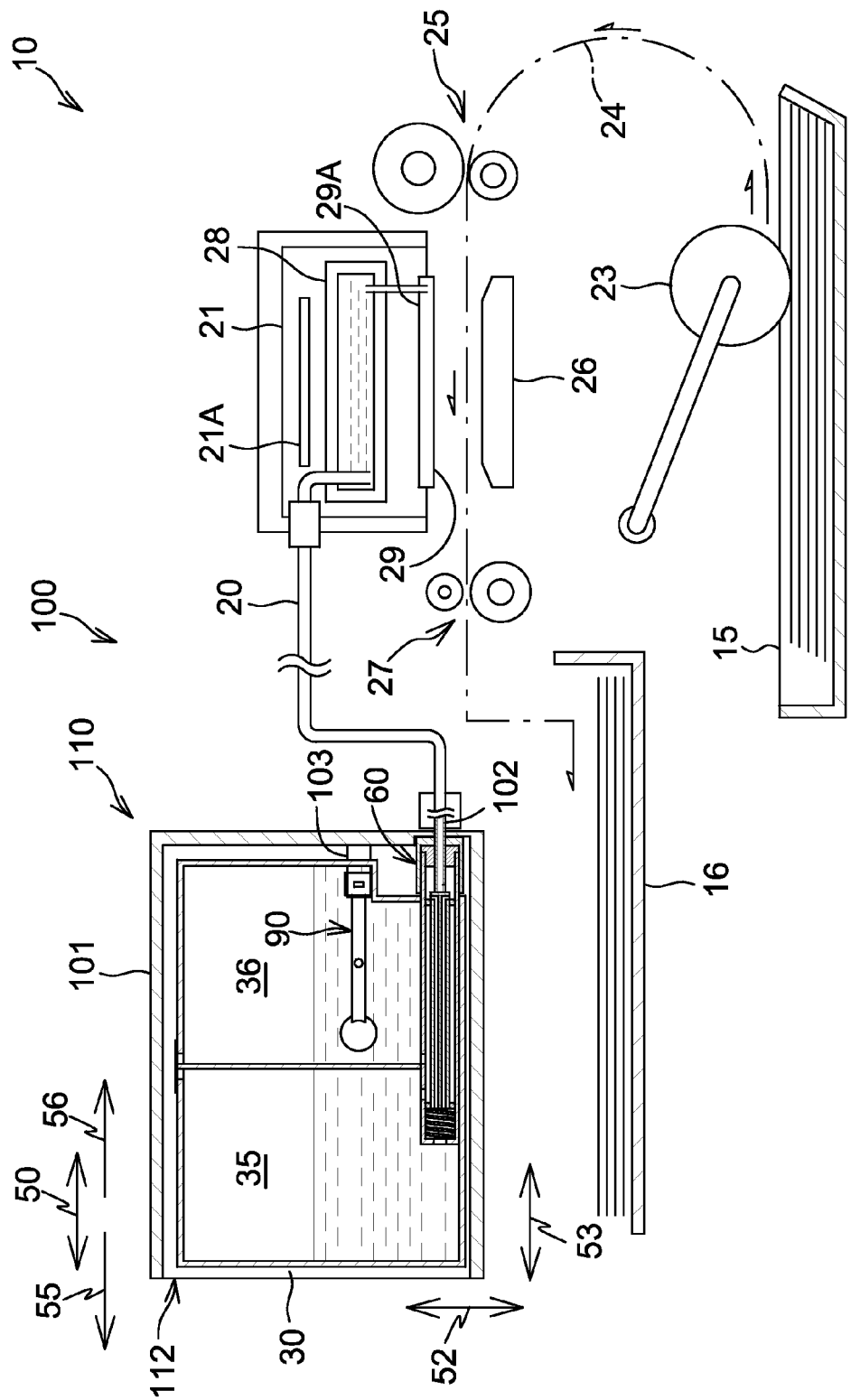
FIG. 1 is a schematic, cross-sectional view of a printer comprising a cartridge mounting portion and an ink cartridge, according to an embodiment of the present invention.

Referring to FIG. 1, a liquid consuming apparatus, e.g., a printer 10 is an inkjet printer configured to record an image on a sheet of recording paper by ejecting ink droplets selectively on the sheet of recording paper. The printer 10 comprises a liquid consuming portion, e.g., a recording head 21, an ink supply device 100, and an ink tube 20 connecting the recording head 21 and the ink supply device 100. The ink supply device 100 comprises a cartridge mounting portion 110. The cartridge mounting portion 110 is configured to allow a liquid container or a liquid cartridge, e.g., an ink cartridge 30 to be mounted therein. The cartridge mounting portion 110 has an opening 112 and the interior of the cartridge mounting portion 110 is exposed to the exterior of the cartridge mounting portion 110 via opening 112. The ink cartridge 30 is configured to be inserted into the cartridge mounting portion 110 via the opening 112 in an insertion direction 56, and to be removed from the cartridge mounting portion 110 via the opening 112 in a removal direction 55.

The ink cartridge 30 is configured to store ink, which is used by the printer 10. The ink cartridge 30 and the recording head 21 are fluidically connected via the ink tube 20 when mounting of the ink cartridge 30 to the cartridge mounting portion 110 has been completed. The recording head 21 comprises a sub tank 28. The sub tank 28 is configured to temporarily store ink supplied via the ink tube 20 from the ink cartridge 30. The recording head 21 comprises nozzles 29 and is configured to selectively eject ink supplied from the sub tank 28 through the nozzles 29. More specifically, the recording head 21 comprises a head control board 21A and piezoelectric actuators 29A corresponding to the nozzles 29, and the head control board 21A is configured to selectively apply driving voltage to the piezoelectric actuators 29A. As such, ink is ejected from the nozzles 29.

The printer 10 comprises a paper feed tray 15, a paper feed roller 23, a conveying roller pair 25, a platen 26, a discharge roller pair 27, and a discharge tray 16. A conveying path 24 is formed from the paper feed tray 15 up to the discharge tray 16 via the conveying roller pair 25, the platen 26, and the discharge roller pair 27. The paper feed roller 23 is configured to feed a sheet of recording paper from the paper feed tray 15 to the conveying path 24. The conveying roller pair 25 is configured to convey the sheet of recording paper fed from the paper feed tray 15 onto the platen 26. The recording head 21 is configured to selectively eject ink onto the sheet of recording paper passing over the platen 26. Accordingly, an image is recorded on the sheet of recording paper. The sheet of recording paper having passed over the platen 26 is discharged by the discharge roller pair 27 to the paper discharge tray 16 disposed at the most downstream side of the conveying path 24.

[Ink Supply Device 100]

Figure 2:
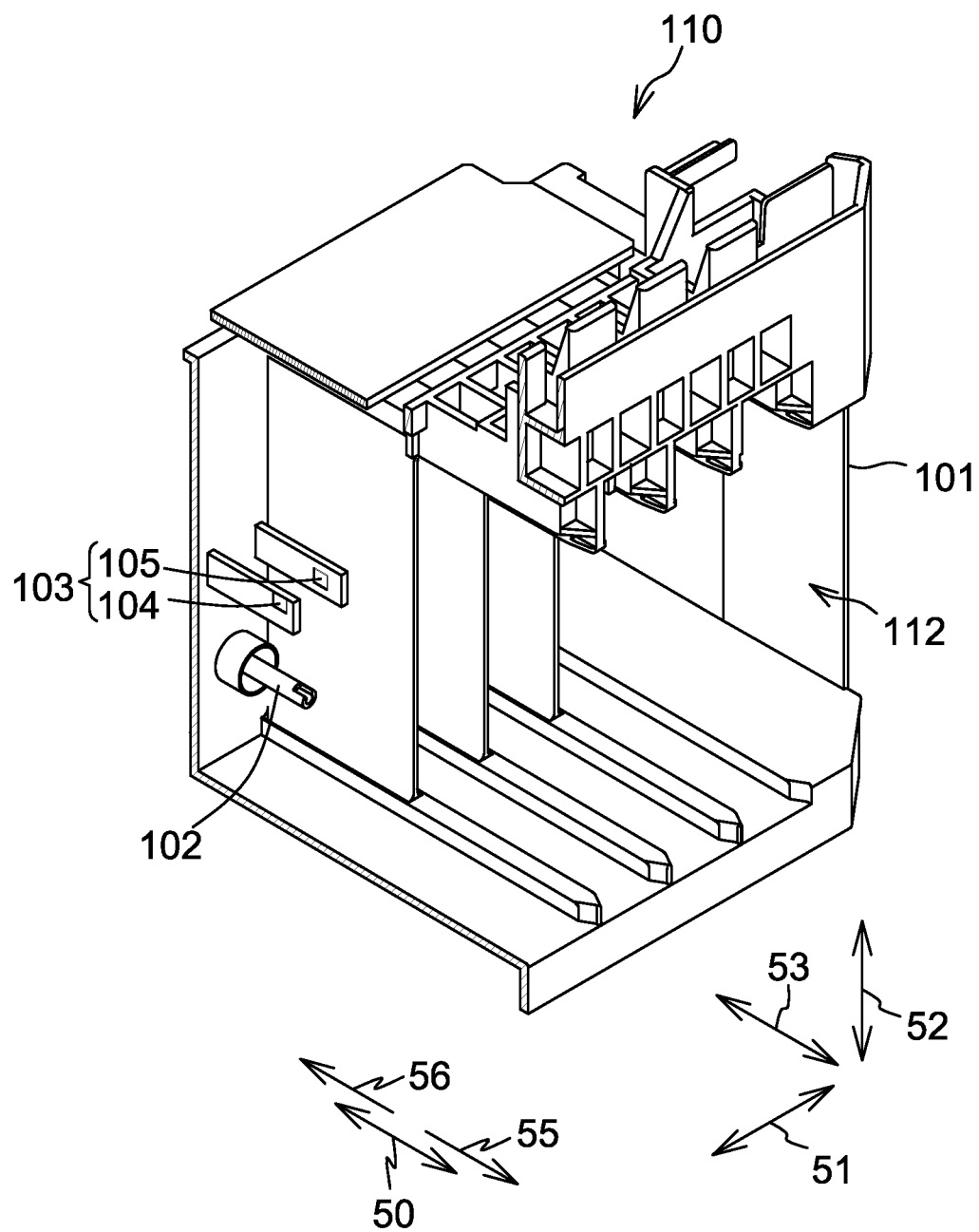
FIG. 2 is a perspective view of the cartridge mounting portion which is partly cut, showing an end surface of the cartridge mounting portion.

Referring to FIG. 1, the printer 10 comprises the ink supply device 100. The ink supply device 100 is configured to supply ink to the recording head 21. The ink supply device 100 comprises the cartridge mounting portion 110 to which the ink cartridge 30 is mountable. The cartridge mounting portion 110 comprises a case 101, a longitudinal object, e.g., a hollow tube 102, and a detector, e.g., a sensor 103. In FIG. 1, mounting of the ink cartridge 30 to the cartridge mounting portion 110 has been completed. Referring to FIG. 2, the cartridge mounting portion 110 is configured to receive four ink cartridges 30 storing cyan, magenta, yellow, and black inks, respectively. Four hollow tubes 102, and four sensors 103 are provided at the cartridge mounting portion 110, corresponding to the four ink cartridges 30.

[Hollow Tube 102]

The case 101 of the cartridge mounting portion 110 has the opening 112 formed through one face of the case 101. The case 101 comprises an end surface opposite the opening 112. Referring to FIGS. 1 and 2, the hollow tube 102 extends from the end surface of the case 101 in the removal direction 55. The hollow tube 102 is positioned at the end surface of the case 101 and at a position corresponding to an ink supply portion 60 (described later) of the ink cartridge 30. The hollow tube 102 is a resin tube having a liquid path formed therein. The hollow tube 102 has a proximal end and a distal end. The hollow tube 102 has an opening formed through a distal-end side of the hollow tube 102, and the ink tube 20 is connected to a proximal-end side of the hollow tube 102. The hollow tube 102 is configured to contact and move a portion of the ink cartridge 30 for allowing ink stored in the ink cartridge 30 to flow into the ink tube 20 via the hollow tube 102.

In this description, when it is described that the ink cartridge 30 is mounted to the cartridge mounting portion 110, it means that at least a portion of the ink cartridge 30 is positioned in the cartridge mounting portion 110, more specifically, positioned in the case 101. Therefore, an ink cartridge 30 which is being inserted into the cartridge mounting portion 110 is also an example of an ink cartridge 30 mounted to the cartridge mounting portion 110. On the other hand, when it is described that the mounting of the ink cartridge 30 to the cartridge mounting portion 110 has been completed, it means that the ink cartridge 30 is in such a state that the printer 10 can perform image recording. For instance, when the ink cartridge 30 is in such a state, ink supply from the ink cartridge 30 to the recording head 21 is at least possible, and preferably the ink cartridge 30 is locked such that the movement of ink cartridge 30 relative to the cartridge mounting portion 110 is restricted or the ink cartridge 30 is positioned in the cartridge mounting portion 110 with the cover closed.

[Sensor 103]

Referring to FIG. 2, the sensor 103 is positioned above the hollow tube 102 and extends from the end surface of the case 101 in the removal direction 55. The sensor 103 comprises a light emitting portion, e.g., a light emitting diode, 104 and a light receiving portion, a phototransistor, 105 aligned in a width direction 51. The light emitting portion 104 and the light receiving portion 105 face each other in the width direction 51. The light emitting portion 104 is configured to emit light, e.g., visible, infrared, and/or ultraviolet light, toward the light receiving portion 105, and the light receiving portion 105 is configured to receive the light emitted by the light emitting portion 104. In this embodiment, the light emitted by the light emitting portion 104 can pass through ink stored in the ink cartridge 30 and walls of the ink cartridge 30. When the mounting of the ink cartridge 30 to the cartridge mounting portion 110 has been completed, the ink cartridge 30 is positioned between the light emitting portion 104 and the light receiving portion 105. In other words, the light emitting portion 104 and the light receiving portion 105 are provided so as to face each other with the ink cartridge 30 positioned therebetween when the mounting of the ink cartridge 30 to the cartridge mounting portion 110 has been completed.

In this embodiment, a detection position is a position within the ink cartridge 30 which intersects an imaginary line extending between the light emitting portion 104 and the light receiving portion 105 when the mounting of the ink cartridge 30 to the cartridge mounting portion 100 has been completed. In other words, the detection position intersects an optical path extending between the light emitting portion 104 and the light receiving portion 105. In other words, the sensor 103 is positioned so as to face the detection position. In this embodiment, the sensor 103 is positioned so as to face the ink cartridge 30 when the mounting of the ink cartridge 30 to the cartridge mounting portion 110 has been completed. In another embodiment, the sensor 103 is positioned so as to face the ink cartridge 30 when the ink cartridge 30 is being inserted into the cartridge mounting portion 110. That is, the sensor 103 is positioned so as to face the ink cartridge 30 mounted to the cartridge mounting portion 110, and the detection position intersects the optical path extending between the light emitting portion 104 and the light receiving portion 105 when the ink cartridge 30 is mounted to the cartridge mounting portion 110.

The sensor 103 is configured to output different detection signals based on the intensity of light received by the light receiving portion 105. The sensor 103 is configured to output a Low-level signal, i.e., a signal whose level is less than a predetermined threshold value, when the intensity of light received by the light receiving portion 105 is less than a predetermined intensity. The sensor 103 is configured to output a High-level signal, i.e., a signal whose level is greater than or equal to the predetermined threshold value, when the intensity of light received by the light receiving portion 105 is greater than or equal to the predetermined intensity.

[Ink Cartridge 30]

Referring to FIGS. 3A and 3B, the ink cartridge 30 comprises a frame 31 having a liquid chamber, e.g., an ink chamber formed therein, and a liquid supply portion, e.g., an ink supply portion 60. The ink chamber is divided into a first ink chamber 35 and a second ink chamber 36. The ink cartridge 30 is configured to supply ink stored in the first ink chamber 35 and the second ink chamber 36 to the exterior of the ink cartridge 30 via the ink supply portion 60. The ink cartridge 30 is configured to be inserted into and removed from the cartridge mounting portion 110 in an insertion-removal direction 50, while the ink cartridge 30 is in an upright position, as shown in FIG. 3A, with a top face of the ink cartridge 30 facing upward and a bottom face of the ink cartridge 30 facing downward. In this embodiment, the insertion-removal direction 50 extends in a horizontal direction. The insertion direction 56 is an example of the insertion-removal direction 50. The removal direction 55 is an example of the insertion-removal direction 50. The insertion direction 56 and the removal direction 55 are opposite directions. In another embodiment, the insertion-removal direction 50 may not extend exactly in a horizontal direction but may extend in a direction intersecting a horizontal direction and the vertical direction.

The frame 31 has substantially a rectangular parallelepiped shape, and its dimension in a width direction (left-right direction) 51 is less than each of its dimension in a height direction (up-down direction) 52 and its dimension in a depth direction (front-rear direction) 53. The width direction 51, the height direction 52, and the depth direction 53 are perpendicular to each other. The width direction 51 extends in a horizontal direction. The depth direction 53 extends in a horizontal direction. The height direction 52 extends in the vertical direction. The insertion-removal direction 50 is parallel with the depth direction 53. The frame 31 comprises a front wall 40, a rear wall 41, a top wall 39, a bottom wall 42, and a right wall 38. The front wall 40 and the rear wall 41 at least partly overlap when viewed in the depth direction 53. The top wall 39 and the bottom wall 42 at least partly overlap when viewed in the height direction 52. The right wall 38 is positioned on one side of the frame 31 with respect to the width direction 51. In this embodiment, the right wall 38 is positioned on the right side of the frame 31 when the frame 31 is viewed from the front-wall 40 side. When the ink cartridge 30 is inserted into the cartridge mounting portion 110, the front wall 40 is positioned at the front side of the ink cartridge 30, and the rear wall 41 is positioned at the rear side of the ink cartridge 30. When the ink cartridge 30 is inserted into the cartridge mounting portion 110, the front wall 40 is oriented toward the insertion direction 56, and the rear wall 41 is oriented toward the removal direction 55. The rear wall 41 is positioned away from the front wall 40 in the removal direction 55. The frame 31 comprises a front outer face, a rear outer face, a top outer face, a bottom outer face, and a right outer face. The front wall 40 comprises the front outer face, the rear wall 41 comprises the rear outer face, the top wall 39 comprises the top outer face, the bottom wall 42 comprises the bottom outer face, and the right wall 38 comprises the right outer face.

Figure 6:
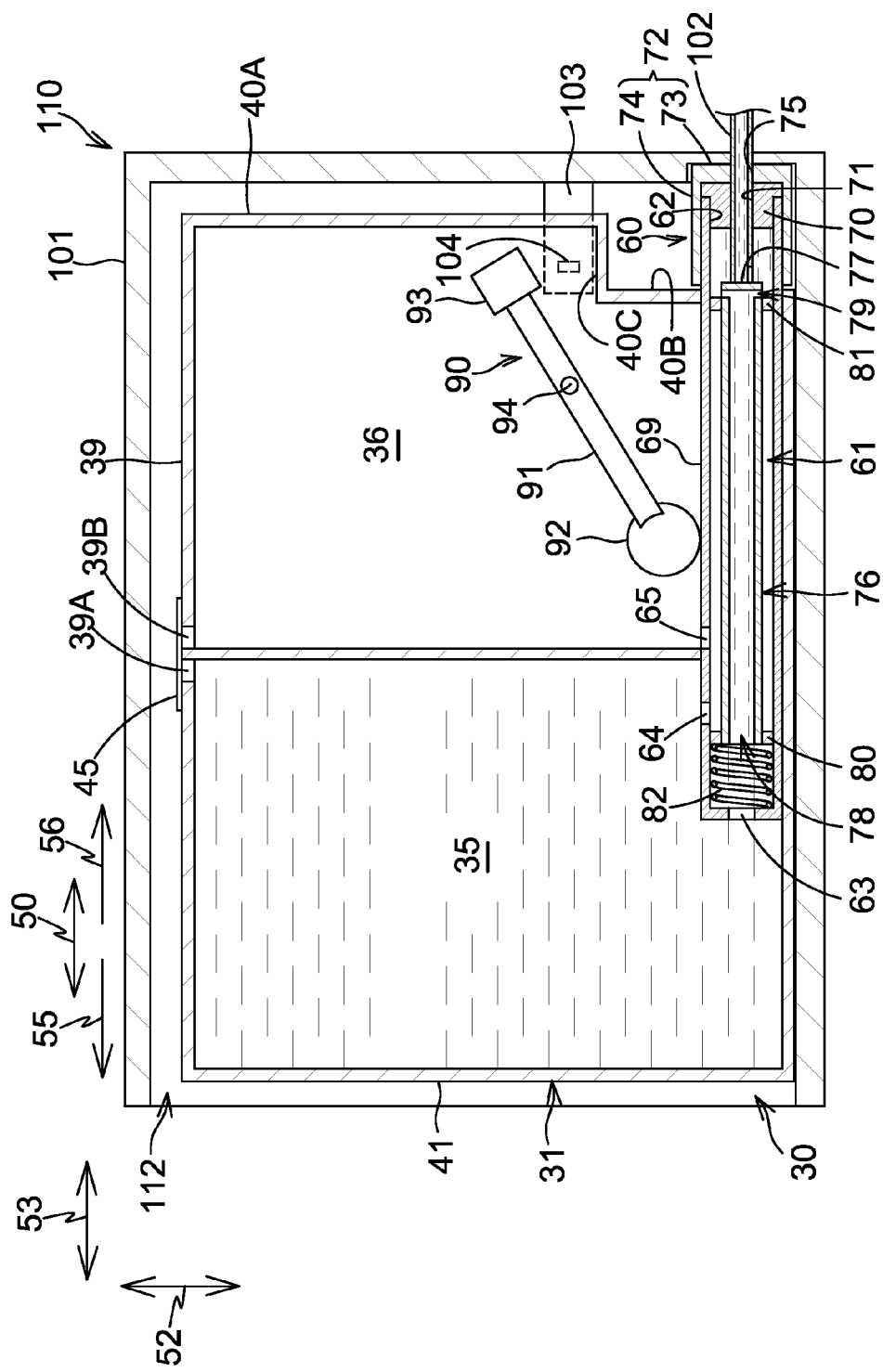
FIG. 6 is a cross-sectional view of the ink cartridge and the cartridge mounting portion when mounting of the ink cartridge to the cartridge mounting portion has been just completed.

The front wall 40 comprises a first wall 40A, a second wall 40B, and a connecting wall 40C. The first wall 40A and the second wall 40B at least partly overlap the rear wall 41 when viewed in the depth direction 53. The first wall 40A is positioned above the second wall 40B and is positioned further forward than the second wall 40B with respect to the insertion direction 56. In other words, the second wall 40B is positioned below the first wall 40A and is positioned further rearward with respect to the insertion direction 56. The connecting wall 40C intersects the first wall 40A and the second wall 40B and extends in parallel with the top wall 39 and the bottom wall 42. The connecting wall 40C is connected to the lower end of the first wall 40A at one end and is connected to the upper end of the second wall 40B at the other end. Referring to FIG. 6, the connecting wall 40C is positioned directly below the detection position.

Referring back to FIGS. 3A and 3B, the top wall 39 is connected to the upper end of the front wall 40, the upper end of the rear wall 41, and the upper end of the right wall 38. The bottom wall 42 is connected to the lower end of the front wall 40, the lower end of the rear wall 41, and the lower end of the right wall 38. The right wall 38 is connected to the right end of the front wall 40, the right end of the rear wall 41, the right end of the top wall 39, and the right end of the bottom wall 42. The other side of the frame 31 with respect to the width direction 51 is opened. In this embodiment, the left side of the frame 31, which is positioned on the left side of the frame 32 when the frame 31 is viewed from the front-wall 40 side, is opened. The frame 31 comprises a partitioning wall 43 partitioning the ink chamber into the first ink chamber 35 and the second ink chamber 36.

The ink cartridge 30 comprises a left wall 37 connected to the left side of the frame 31 with respect to the width direction 51. In this embodiment, the left wall 37 is a film 44. The film 44 and the frame 31 have almost the same outer contour when viewed in the width direction 51. The film 44 is welded to the left end of the front wall 40, the left end of the rear wall 41, the left end of the top wall 39, the left end of the bottom wall 42, and the left end of the partitioning wall 43 by heat. As such, it is possible to store ink in the ink chamber defined by the front wall 40, the rear wall 41, the top wall 39, the bottom wall 42, the right wall 38, and the left wall 37 (the film 44). The left wall 37 (the film 44) allows the light emitted from the light emitting portion 104 of the sensor 103 to pass therethrough. The ink cartridge 30 may comprise a cover covering the film 44 from outside. In such a case, the cover also allows the light emitted from the light emitting portion 104 of the sensor 103 to pass therethrough.

[First Ink Chamber 35, Second Ink Chamber 36]

The partitioning wall 43 is disposed between the front wall 40 and the rear wall 41 with respect to the depth direction 53. The partitioning wall 43 is connected to the inner surface of the left wall 37, the inner surface of the right wall 38, the inner surface of the top wall 39, and the inner surface of the bottom wall 42. The partitioning wall 43 partitions the inner space of the frame 31, i.e., the ink chamber into the first ink chamber 35 and the second ink chamber 36. The first ink chamber 35 is positioned in rear of the partitioning wall 43 with respect to the insertion direction 56 and is defined by the inner surface of the left wall 37, the inner surface of the right wall 38, the inner surface of the top wall 39, the inner surface of the bottom wall 42, the inner surface of the rear wall 41, the rear surface of the partitioning wall 43, and the outer surface of the wall of an outer cylindrical member 69 (described below) of the ink supply portion 60. The second ink chamber 36 is positioned in front of the partitioning wall 43 with respect to the insertion direction 56 and is defined by the inner surface of the left wall 37, the inner surface of the right wall 38, the inner surface of the top wall 39, the inner surface of the bottom wall 42, the inner surface of the front wall 40, and the front surface of the partitioning wall 43, and the outer surface of the wall of the outer cylindrical member 69 of the ink supply portion 60. The first ink chamber 35 and the second ink chamber 36 are aligned in the depth direction 53. The part of the wall of the outer cylindrical member 69 of the ink supply portion 60 positioned in rear of the partitioning wall 43 and the part of the bottom wall 42 positioned in rear of the partitioning wall 43 correspond to the bottom wall of the first ink chamber 35 defining the bottom end of the first ink chamber 35. The part of the wall of the outer cylindrical member 69 of the ink supply portion 60 positioned in front of the partitioning wall 43 and the part of the bottom wall 42 positioned in front of the partitioning wall 43 correspond to the bottom wall of the second ink chamber 36 defining the bottom end of the second ink chamber 36.

The top wall 39 has an opening 39A and an opening 39B formed therethrough. The opening 39A is formed through a part of the top wall 39 defining the top end of the first ink chamber 35, and the first ink chamber 35 can be in communication with the atmosphere outside the ink cartridge 30 through the opening 39A. The opening 39B is formed through a part of the top wall 39 defining the top end of the second ink chamber 36, and the second ink chamber 36 can be in communication with the atmosphere outside the ink cartridge 30 through the opening 39B. The positions of the openings 39A and 39B are not limited to the top wall 39, but can be any wall of the frame 31. Preferably, the openings 39A and 39B are positioned above the ink surface in the first ink chamber 35 and the second ink chamber 36.

The ink cartridge 30 comprises an air permeable film 45 attached to the top wall 39. The air permeable film 45 covers the opening 39A and the opening 39B. The air permeable film 45 allows air to pass therethrough, but blocks liquid from passing therethrough. The air permeable film 75 is a porous film and is made of polytetrafluoroethylene, polychlorotrifluoroethylene, tetrafluoroethylene-hexafluoropropylene copolymer, tetrafluoroethylene-perfluoroalkyl vinyl ether copolymer, tetrafluoroethylene-ethylene copolymer or another known material.

[Movable Member 90]

The ink cartridge 30 comprises a movable member 90 positioned in the second ink chamber 36. The movable member 90 comprises a detection portion 93 and a float 92. In this description, when it is described that a movable member comprises a detection portion and a float it at least means that the movable member comprises the detection portion and the float as portions of the movable member, or that the movable member comprises the detection portion and the float as the entirety of the movable member. In this embodiment, the movable member 90 comprises an arm 91, and the detection portion 93 is positioned at one end of the arm 91 and the float 92 is positioned at the other end of the arm 91. The frame 31 comprises a shaft 94 extending in the width direction 51 from the inner surface of the right wall 38 to the left wall 37 (the film 44). The arm 91 is supported by the shaft 94 between the detection portion 93 and the float 92, such that the arm 91 can pivot about the shaft 94. The detection portion 93 is positioned closer to the front wall 40 than the float 92 is. The float 92 has a specific gravity which is less than the specific gravity of ink stored in the ink chamber. The float 92 is heavier than the detection portion 93.

The detection portion 93 comprises a light blocking portion. In this embodiment, the detection portion 93 comprises the light blocking portion as its entirety. That is, the detection portion 93 and the light blocking portion are one and the same member. The detection portion (light blocking portion) 93 is configured to block the light emitted by the light emitting portion 104 of the sensor 103. More specifically, when the detection portion (light blocking portion) 93 is in the detection position and the light emitted by the light emitting portion 104 of the sensor 103 reaches one side of the detection portion (light blocking portion) 93 in a direction (the width direction 51) perpendicular to the insertion-removal direction 50, an amount (intensity) of light coming out of the other side of the detection portion (light blocking portion) 93 and reaching the light receiving portion 105 of the sensor 103 is less than a predetermined amount (intensity), e.g., zero. The blocking of the light is caused by the detection portion (light blocking portion) 93 completely preventing the light from passing therethrough in width direction 51 perpendicular to the insertion-removal direction 50, by the detection portion (light blocking portion) 93 absorbing some amount of the light, by the detection portion (light blocking portion) 93 deflecting the light, by detection portion (light blocking portion) 93 totally reflecting the light, or by another phenomenon. For instance, the detection portion (light blocking portion) 93 is made of an opaque resin containing pigment, or made of a transparent or semi-transparent resin, but has a prism-like shape configured to deflect light, or comprises a reflection film, e.g., an aluminum film on its surface. On the other hand, when the detection portion (light blocking portion) 93 is not in the detection position and the light emitted by the light emitting portion 104 of the sensor 103 reaches one side of the ink cartridge 30 in the width direction 51 perpendicular to the insertion-removal direction 50, an amount (intensity) of light coming out of the other side of the ink cartridge 30 and reaching the light receiving portion 105 of the sensor 103 is greater than or equal to the predetermined amount (intensity). As such, the amount (intensity) of the light reaching the light receiving portion 105 of the sensor 103 depends on whether the detection portion (light blocking portion) 93 is in the detection position or not.

Figure 5:
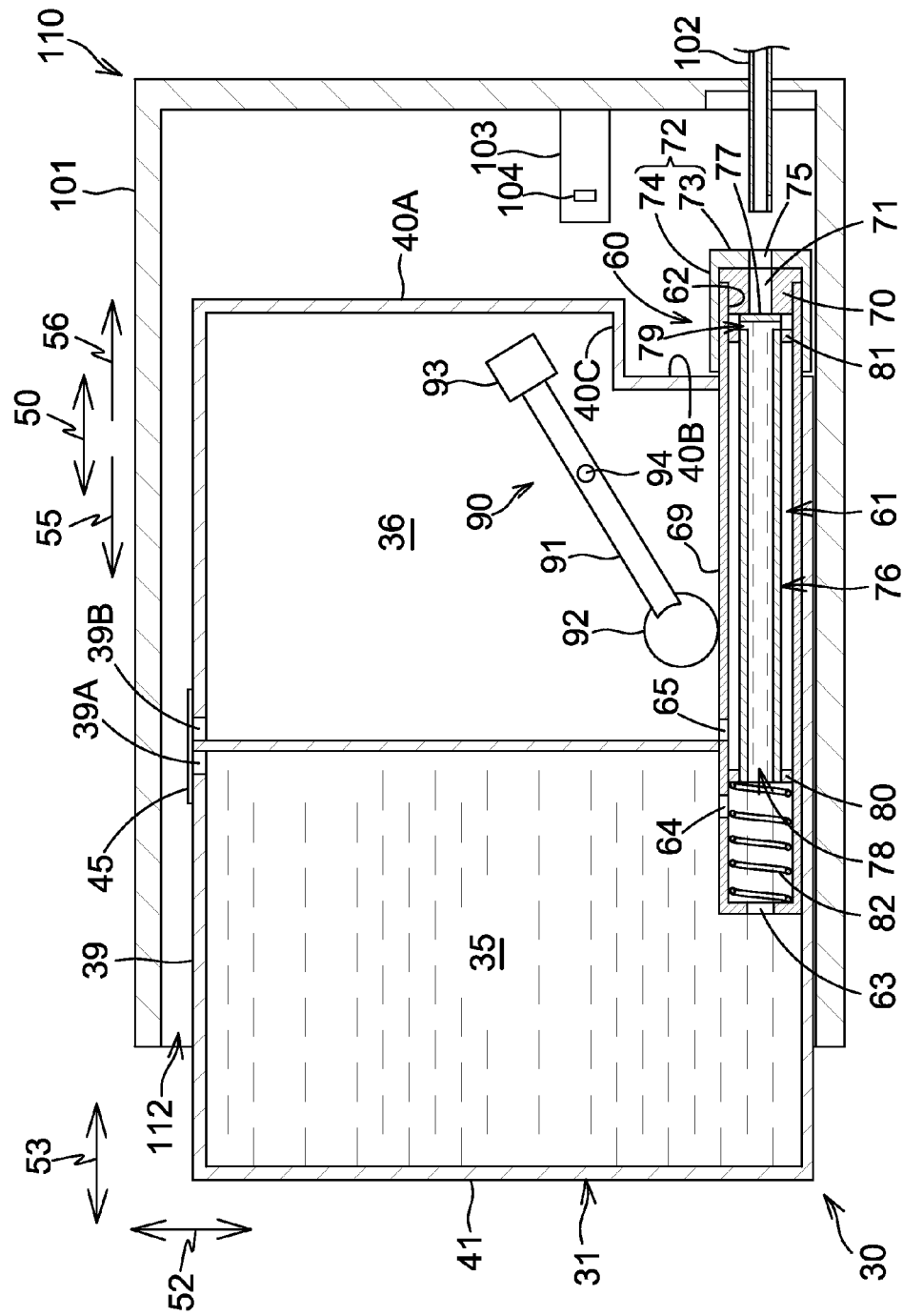
FIG. 5 is a cross-sectional view of the ink cartridge and the cartridge mounting portion during insertion of the ink cartridge into the cartridge mounting portion.
Figure 7:
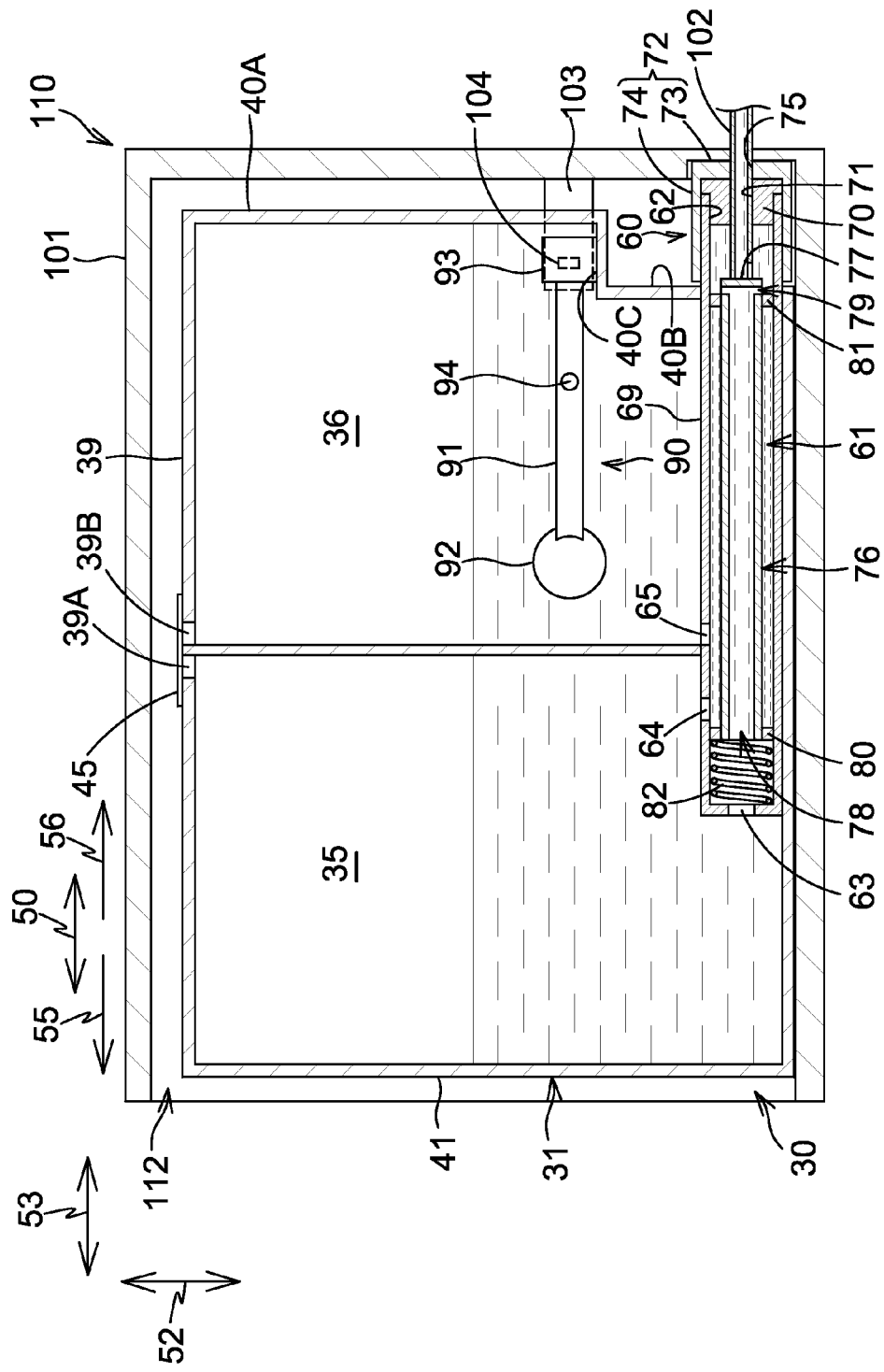
FIG. 7 is a cross-sectional view of the ink cartridge and the cartridge mounting portion when mounting of the ink cartridge to the cartridge mounting portion has been completed and a detection portion reaches a detection position.
Figure 8:
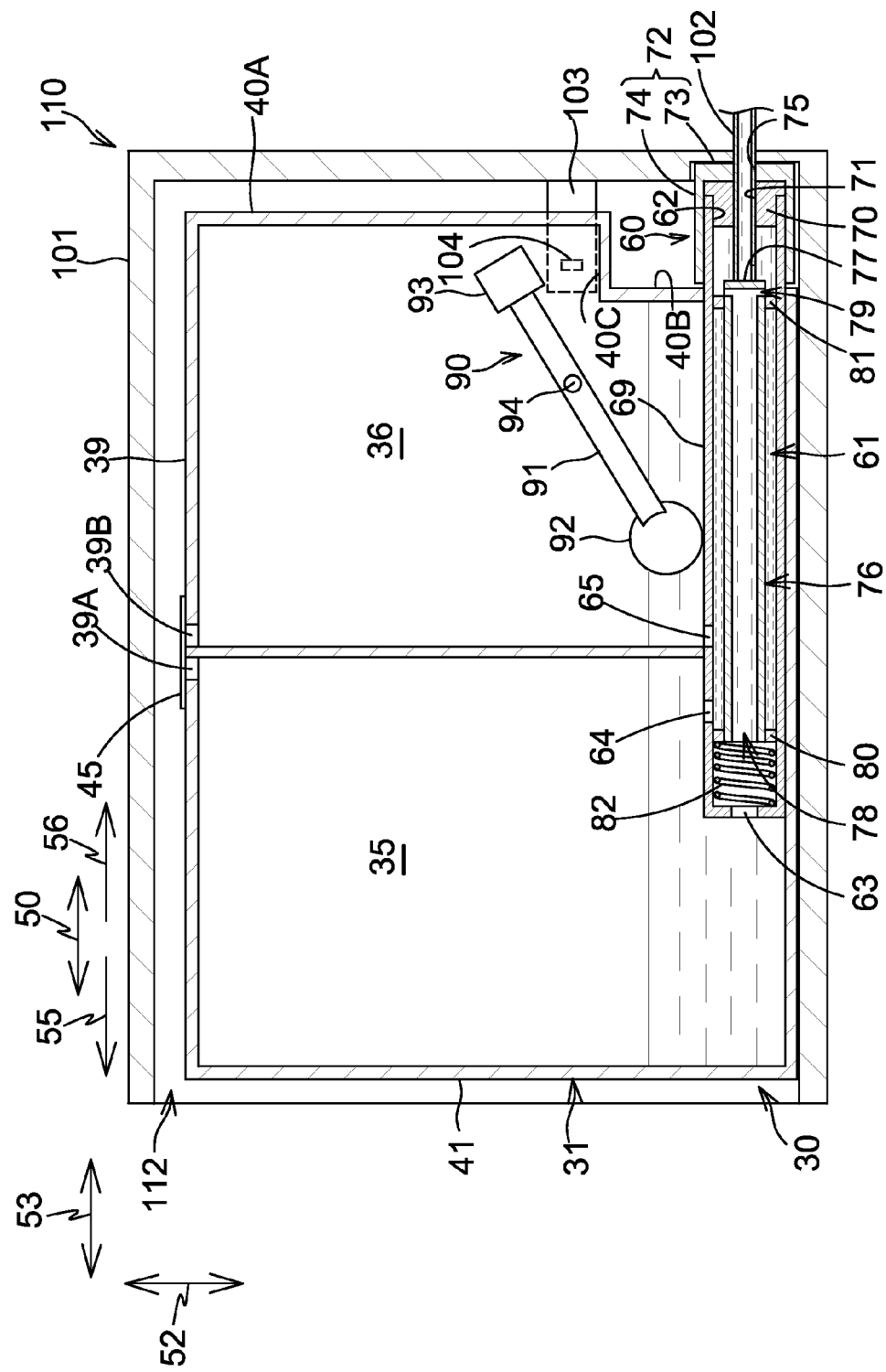
FIG. 8 is a cross-sectional view of the ink cartridge and the cartridge mounting portion when mounting of the ink cartridge to the cartridge mounting portion has been completed and the detection portion has moved out of a detection position.

The movable member 90 is configured to pivot about the shaft 94 depending on the ink amount in the second ink chamber 36. When the ink surface in the second ink chamber 36 moves up, the float 92 moves up and the movable member 90 pivots in the clockwise direction in FIG. 5, such that the detection portion (light blocking portion) 93 moves down. When the ink surface in the second ink chamber 36 lowers, the float 92 moves down and the movable member 90 pivots in the counter-clockwise direction in FIG. 5, such that the detection portion (light blocking portion) 93 moves up. When the amount of ink stored in the second ink chamber 36 is small or zero, the float 92 is positioned close to or contacts the bottom wall of the second ink chamber 36, i.e., is positioned closer to or contacts the outer cylindrical member 69 of the ink supply portion 60, and the detection portion (light blocking portion) 93 is out of the detection position as shown in FIGS. 5, 6, and 8. When the amount ink stored in the second ink chamber 36 is large, the float 92 is submerged in ink, and the detection portion (light blocking portion) 93 is in the detection position as shown in FIG. 7.

[Ink Supply Portion 60]

Referring to FIGS. 3A, 3B, and 5-9, the ink supply portion 60 comprises an outer cylindrical member 69, a valve seat 70, a cap 72, an inner cylindrical member 76, a first sealing member 80, a second sealing member 81, and a coil spring 82. The inner space of the outer cylindrical member 69 is an ink supply chamber 61 that forms an ink supply passage. The outer cylindrical member 69 and inner cylindrical member 76 are cylindrically-shaped in the illustrated example and thus referred to as respective "cylindrical" members, though other shapes could be used for the outer and inner members 69, 76. The outer cylindrical member 69 has an opening 62, an opening 63, and opening 64, and an opening 65 formed therethrough. The ink supply chamber 61 can be in communication with the exterior of the outer cylindrical member 69 via the openings 62, 63, 64, and 65. The outer cylindrical member 69 extends in the depth direction 53. The opening 62 is formed at the front end of the outer cylindrical member 69 and the opening 63 is formed at the rear end of the outer cylindrical member 69. The openings 64 and 65 are formed at the circumferential wall of the outer cylindrical member 69 of the ink supply portion 60. The openings 64 and 65 are positioned away from each other in the depth direction 53. The opening 64 is positioned further rearward than the opening 65.

The second wall 40B of the front wall 40 has an opening 40D formed therethrough and the partitioning wall 43 has an opening 43A formed therethrough. The opening 40D and the opening 43A are aligned in the depth direction 53. The ink supply portion 60 is inserted through the openings 40D and 43A and fixed to the frame 31. For instance, the gap between the circumferential wall of the outer cylindrical member 69 and the second wall 40B of the front wall 40 at the opening 40D is filled with adhesive, and the gap between the circumferential wall of the outer cylindrical member 69 and the portioning wall 43 at the opening 43A is filled with adhesive. Alternatively, the circumferential wall of the outer cylindrical member 69 and the second wall 40B of the front wall 40 are welded at the opening 40D without any gap formed therebetween, and the circumferential wall of the outer cylindrical member 69 and the partitioning wall 43 are welded at the opening 43A without any gap formed therebetween. Since the ink supply portion 60 extends through the front wall 40, the ink supply portion 60 is positioned at the front wall 40.

The wall of the outer cylindrical member 69 forms a part of the bottom wall of the first ink chamber 35 and a part of the bottom wall of the second ink chamber 36. The ink supply chamber 61 is positioned below a part of the first ink chamber 35. The ink supply chamber 61 also is positioned below a part of the second ink chamber 36.

The front end of the ink supply portion 60 is positioned outside of the frame 31. Therefore, the opening 62 is positioned outside of the ink cartridge 30. The openings 63 and 64 face the first ink chamber 35. The opening 65 faces the second ink chamber 36. The ink supply chamber 61 can communicate with the exterior of the ink cartridge 30 through the opening 62, the ink supply chamber 61 can communicate with the first ink chamber 35 through the openings 63 and 64, and the ink supply chamber 61 can communicate with the second ink chamber 36 through the opening 65.

The valve seat 70 and the cap 72 are attached to the front end of the outer cylindrical member 69. The valve seat 70 has substantially a disc shape. The outer diameter of the valve seat 70 is equal to or almost equal to the outer diameter of the outer cylindrical member 69 before inserted into the ink supply chamber 61. The valve seat 70 is made of an elastic material such as rubber. A part of the valve seat 70 is inserted into the ink supply chamber 61 through the opening 62 and sealingly contacts the inner surface of the outer cylindrical member 69. Another part of the valve seat 70 is positioned outside the ink supply chamber 61 and contacts the front end of the outer cylindrical member 69 where the opening 62 is provided. The valve seat 70 has an ink supply opening 71 formed therethrough in the depth direction 53. The ink supply chamber 61 can be communication with the exterior of the ink cartridge 30 through the ink supply opening 71. The diameter of the ink supply opening 71 is slightly less than the outer diameter of the hollow tube 102.

The cap 72 comprises a circular lid portion 73 and a cylindrical portion 74 extending from the outer edge of the lid portion 73. The lid portion 73 has an opening 75 formed therethrough in the depth direction 53 at the center of the lid portion 73. The diameter of the opening 75 is greater than the diameter of the ink supply opening 71 of the valve seat 70. The lid portion 73 contacts the valve seat 70 in the depth direction 53 on the side opposite from the ink supply chamber 61. Therefore, the valve seat 70 is sandwiched between the lid portion 73 and the front end of the outer cylindrical member 69 in the depth direction 53. The cylindrical portion 74 covers the circumferential surface of the valve seat 70 and a part of the circumferential surface of the outer cylindrical member 69. The cap 72 is fixedly attached to, e.g., welded to, outer cylindrical member 69 or the front wall 40 for retaining the valve seat 70 at the front end of the outer cylindrical member 69.

The inner cylindrical member 76, the first sealing member 80, the second sealing member 81, and the coil spring 82 are disposed in the ink supply chamber 61. In the illustrated example, the inner cylindrical member 76 has substantially a cylindrical shape having an inner space. The inner cylindrical member 76 has a valve member 77 at its front end wall. The valve member 77 is configured to contact the valve seat 70. The inner cylindrical member 76 has an opening 78 at its rear end. The inner cylindrical member 76 has an opening 79 formed through the circumferential wall of the inner cylindrical member 76 at a position adjacent to the valve member 77. The inner space of the inner cylindrical member 76 can be in communication with the exterior of the inner cylindrical member 76 through the openings 78, 79. The outer diameter of the inner cylindrical member 76 is less than the inner diameter of the outer cylindrical member 69, i.e., the diameter of the ink supply chamber 61. The inner cylindrical member 76 is disposed in the outer cylindrical member 69 with the valve member 77 facing the valve seat 70 and the opening 78 facing the opening 63. The inner cylindrical member 76 is movable in the depth direction 53 relative to the outer cylindrical member 69. The inner cylindrical member 76 has a rigidity greater than the rigidity of the first sealing member 80 and the second sealing member 81. For instance, the inner cylindrical member 76 is made of synthetic resin. The ink supply opening 71 and the inner cylindrical member 76 is aligned in the depth direction 53.

Each of the first sealing member 80 and the second sealing member 81 extends continuously in the circumferential direction around the circumferential wall of the inner cylindrical member 76. Each of the first sealing member 80 and the second sealing member 81 may be an O-ring through which the inner cylindrical member 76 is inserted. Each of the first sealing member 80 and the second sealing member 81 is made of an elastic material such as rubber. The first sealing member 80 and the second sealing member 81 are positioned away from each other in the depth direction 53. The first sealing member 80 is positioned further rearward than the second sealing member 81 is, i.e., the first sealing member 80 is closer to the opening 63 than the second sealing member 81 is. In other words, the second sealing member 81 is positioned further forward than the first sealing member 80 is, i.e., the second sealing member 81 is positioned closer to the opening 62 than the first sealing member 80 is. The second sealing member 81 is positioned further rearward than the opening 79 is.

Each of the first sealing member 80 and the second sealing member 81 sealingly contacts the inner surface of the circumferential wall of the outer cylindrical member 69 and the outer surface of the circumferential wall of the inner cylindrical member 76. When the first sealing member 80 and the second sealing member 81 are attached to the inner cylindrical member 76, but not inserted into the outer cylindrical member 69, the outer diameter of each of the first sealing member 80 and the second sealing member 81 is greater than the inner diameter of the outer cylindrical member 69. Therefore, each of the first sealing member 80 and the second sealing member 81 is elastically deformed between the inner surface of the circumferential wall of the outer cylindrical member 69 and the outer surface of the circumferential wall of the inner cylindrical member 76, such that the outer diameter thereof is reduced. The first sealing member 80 and the second sealing member 81 moves with the inner cylindrical member 76 in the depth direction 53 in the ink supply chamber 61. When the first sealing member 80 and the second sealing member 81 moves with the inner cylindrical member 76, the first sealing member 80 and the second sealing member 81 slides on the inner surface of the outer cylindrical member 69.

The ink supply chamber 61 has a first space positioned in rear of the first sealing member 80 and has a second space positioned in front of the second sealing member 81. The communication between the first space and the second space outside the inner cylindrical member 76 is blocked by the first sealing member 80 and the second sealing member 81. On the other hand, the first space and the second space are in communication with each other through the opening 78, the opening 79, and the inner space of the inner cylindrical member 76. The opening 63, the first space, the opening 78, the inner space of the inner cylindrical member 76, the opening 79, the second space forms an ink supply path through which the first ink chamber 35 can be in communication with the exterior of the ink cartridge 30.

The coil spring 82 is positioned between the inner cylindrical member 76 and the rear end wall of the outer cylindrical member 69 where the opening 63 is formed. More specifically, one end of the coil spring 82 contacts a portion surrounding the opening 78 and the other end of the coil spring 82 contacts a portion surrounding the opening 63. The coil spring 82 is configured to bias the inner cylindrical member 76 forward in the depth direction 53. In another embodiment, a leaf spring or any known biasing member can be used instead of the coil spring 82.

Referring to FIG. 5, the coil spring 82 biases the inner cylindrical member 76 into a first position. When the inner cylindrical member 76 is in the first position, the valve member 77 sealingly contacts a portion of the valve seat 70 surrounding the ink supply opening 71, such that the valve member 77 closes the ink supply opening 71. This position of the valve member 77 is a close position. Moreover, the first sealing member 80 sealingly contacts the inner surface of the outer cylindrical member 69 at a position in front of the opening 64 and in rear of the opening 65. The second sealing member 81 sealingly contacts the inner surface of the outer cylindrical member 69 at a portion in rear of the opening 62, the ink supply opening 71, the opening 75, and the opening 79, and in front of the opening 65. The communication between the opening 65 and the opening 62 is blocked. The communication between the opening 65 and the ink supply opening 71 is blocked. The communication between the opening 65 and the opening 75 is blocked. The communication between the opening 65 and the opening 79 is blocked. The communication between the opening 65 and the opening 64 is blocked. The inner cylindrical member 76, the first sealing member 80, and the second sealing member 81 are a movable blocking member configured to block the communication between the first liquid chamber 35 and the second liquid chamber 36 through the ink supply chamber 61. Ink is prevented from flowing from the first ink chamber 35 to the second ink chamber 36 through the ink supply chamber 61. The position of the inner cylindrical member 76, the first sealing member 80, and the second sealing member 81 is a block position.

Referring to FIG. 6, when the inner cylindrical member 76 is in a second position which is closer to the rear wall 41 than the first position is, the valve member 77 is positioned away from the valve seat 70, such that the valve member 77 opens the ink supply opening 71. This position of the valve member 77 is an open position, which is closer to the rear wall 41 than the close position is. Moreover, the first sealing member 80 sealingly contacts the inner surface of the outer cylindrical member 69 at a position in front of the opening 63 and in rear of the opening 64. The second sealing member 81 sealingly contacts the inner surface of the outer cylindrical member 69 at a position in rear of the opening 62, the ink supply opening 71, the opening 75, and the opening 79, and in front of the opening 65. The communication between the opening 65 and opening 64 is established. The position of the inner cylindrical member 76, the first sealing member 80, and the second sealing member 81 is a communication position. The communication between the first liquid chamber 35 and the second liquid chamber 36 through the ink supply chamber 61 is established. Ink is allowed to flow from the first liquid chamber 35 to the second liquid chamber 36 through a communication path, i.e., the opening 64, the ink supply chamber 61, and the opening 65. The communication position is closer to the rear wall 41 than the block position is.

The communication path, i.e., the opening 64, the ink supply chamber 61, and the opening 65, is positioned in a lower half portion of the ink cartridge 30. A portion of the first ink chamber 35 and a portion of the second ink chamber 36 are positioned in an upper half portion of the ink cartridge 30. Therefore, the portion of the first ink chamber 35 and the portion of the second ink chamber 36 are positioned above the communication path, i.e., the opening 64, the ink supply chamber 61, and the opening 65.

Before the ink cartridge 30 is mounted to the cartridge mounting portion 110, i.e., when the inner cylindrical member 76, the first sealing member 80, and the second sealing member 81 are initially in the block position, the first ink chamber 35 stores ink therein and the second ink chamber 36 does not store ink therein.

[Controller 130]

Figure 4:
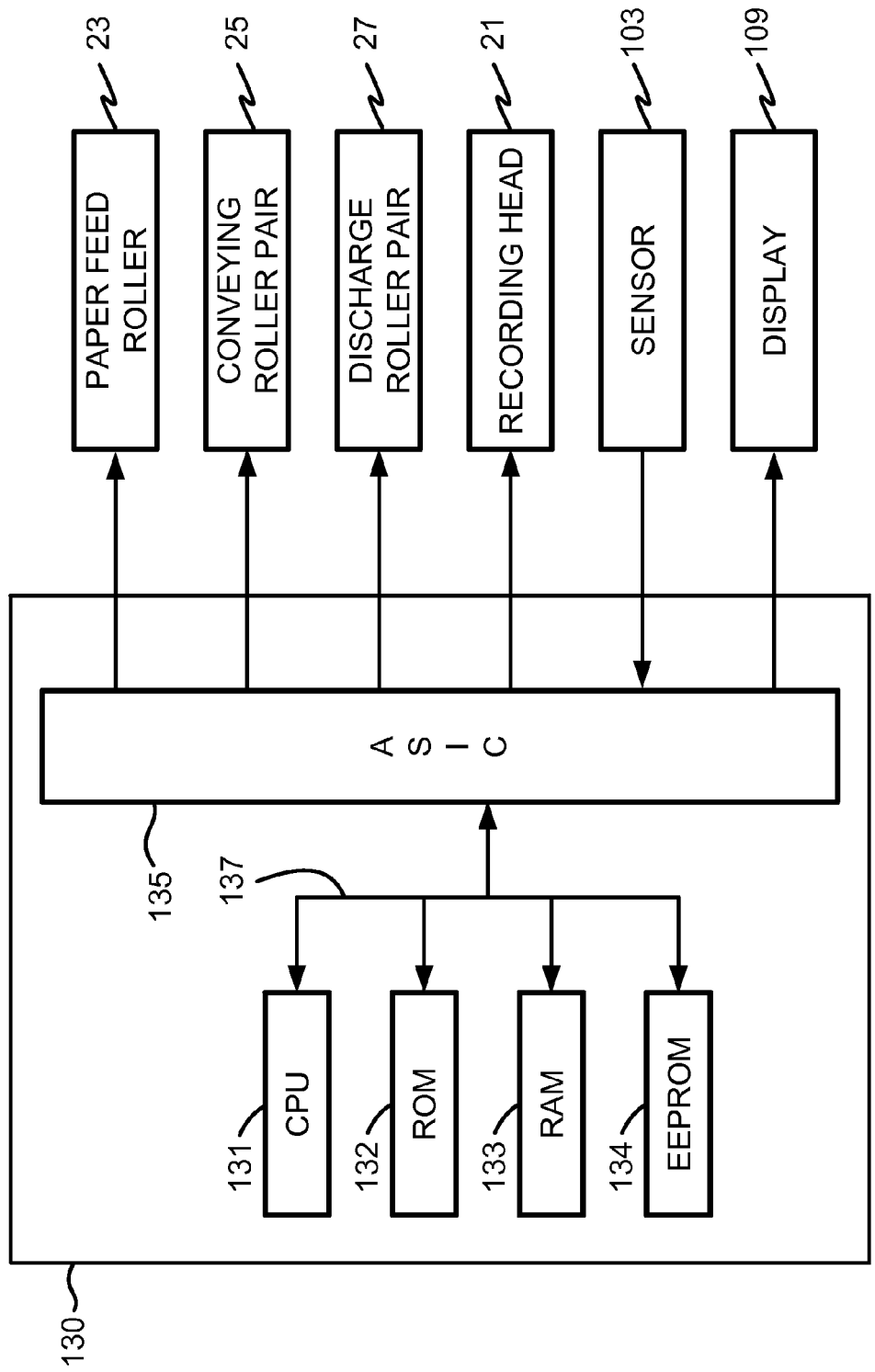
FIG. 4 is a functional block diagram of the printer.

Referring to FIG. 4, the printer 10 comprises a controller 130. The controller 130 comprises a CPU 131, a ROM 132, a RAM 133, an EEPROM 134, and an ASIC 135, which are connected to each other by an internal bus 137. The ROM 132 stores programs for the CPU 131 to control various operations of the printer 10. The RAM 133 is used as a storage area for temporarily store date and signals for the CPU 131 to use in executing the programs and as a working area for date processing. The EEPROM 134 stores settings and flags which may be retained even after the power is off. One chip may comprise the CPU 131, the ROM 132, the RAM 133, the EEPROM 134, and the ASIC 135, or one chip may comprise some of the CPU 131, the ROM 132, the RAM 133, the EEPROM 134, and the ASIC 135, and another chip may comprise the other of the CPU 131, the ROM 132, the RAM 133, the EEPROM 134, and the ASIC 135.

The controller 130 is configured to rotate the paper feed roller 23, the conveying roller pair 25, and the discharge roller pair 27 by driving a motor (not shown). The controller 130 is configured to control the recording head 21 to eject ink from the nozzles 29. More specifically, the controller 130 is configured to send to the head control board 21A control signals indicating the values of driving voltages to be applied to the piezoelectric actuators 29A. The head control board 21A is configured to apply the driving voltages to the piezoelectric actuators 29A based on the control signals received from the controller 130, such that ink is ejected from the nozzles 29. The printer 10 also comprises a display 109, and the controller 130 is configured to control the display 109 to display information about the printer 10 and the ink cartridge 30 or a variety of messages. The controller 130 is configured to receive the detection signals output from the sensor 103.

Referring to FIG. 5, when the ink cartridge 30 is being inserted into the cartridge mounting portion 110, the inner cylindrical member 76 is in the first position, i.e., the valve member 77 is in the close position, and the inner cylindrical member 76, the first sealing member 80, and the second sealing member 81 are in the block position. The detection portion 93 is not in the detection position. The sensor 103 outputs the High-level signal to the controller 130.

Referring to FIG. 6, when the ink cartridge 30 is further inserted into the cartridge mounting portion 110, the inner cylindrical member 76 is pushed by the hollow tube 102 inserted through the opening 75 and the ink supply opening 71. That is, the hollow tube 102 contacts the valve member 77 and moves the inner cylindrical member 76. The inner cylindrical member 76 moves from the first position to the second position against a biasing force of the coil spring 82, i.e., the valve member 77 moves from the close position to the open position, and the inner cylindrical member 76, the first sealing member 80, and the second sealing member 81 move from the block position to the communication position.

The outer surface of the hollow tube 102 sealingly contacts a surface of the valve seat 70 defining the ink supply opening 71 while pushing the valve seat 70 radially. The distal end of the hollow tube 102 is positioned in the ink supply chamber 61. As a result, ink can flow out of the first ink chamber 35 into the hollow tube 102 through the opening 63, the first space of the ink supply chamber 61, the opening 78, the inner space of the inner cylindrical member 76, the opening 79, and the second space of the ink supply chamber 76.

In FIG. 6, ink has not flown into the second ink chamber 36 because the mounting of the ink cartridge 30 to the cartridge mounting portion 100 has been just completed. Therefore, the detection portion 96 still is not in the detection position. The sensor 103 outputs the High-level signal to the controller 130.

Referring to FIG. 7, as time passes from the state shown in FIG. 6, ink flows from the first ink chamber 35 into the second ink chamber 36 through the communication path, i.e., the opening 64, the ink supply chamber 61, and the opening 65. Finally the height of the ink surface in the first ink chamber 35 and the height of the ink surface in the second ink chamber 36 becomes the same. As the ink surface in the second ink chamber 35 moves up, the movable member 90 pivots in a first direction, i.e., the clockwise direction in FIG. 7, until the detection portion 93 contacts the connecting wall 40C. As a result, the detection portion 96 reaches the detection position and blocks the light emitted by the light emitting portion 104. The sensor 103 outputs the Low-level signal to the controller 130.

Referring to FIG. 8, as the recording head 21 ejects ink, ink flows out of the first ink chamber 35 and is supplied to the recording head 21. As ink is consumed from the first ink chamber 35, ink flows from the second ink chamber 36 back to the first ink chamber 35 through the communication path. As ink surface in the second ink chamber 36 lowers, the float 92 moves down and the movable member 90 pivots in a second direction, i.e., the counter-clockwise direction in FIG. 8. The detection portion 93 moves out of the detection position, and the sensor outputs the High-level signal to the controller 130.

[Processes Performed by the Controller 130]

The controller 130 determines that the mounting of the ink cartridge 30 to the cartridge mounting portion 110 is completed when the detection signal output from the sensor 103 changes from the High-level signal to the Low-level signal. Subsequently, when the detection signal output from the sensor 103 changes from the Low-level signal to the High-level signal, the controller starts to perform a remaining ink amount determination process of FIG. 9.

The controller 130 determines whether a near-empty flag is set to "ON" at step 31. The near-empty flag and an empty flag (described later) are set for each ink cartridge 30. The controller 130 sets each of the near-empty flag and the empty flag to "OFF" when the corresponding ink cartridge 30 is removed from the cartridge mounting portion 110.

If the near-empty flag is set to "OFF" (step S31: No), the controller 130 sets the near-empty flat to "ON" at step S32. Subsequently, the controller 130 notifies a user that the remaining ink amount in the ink cartridge 30 has become less than a threshold amount at step S33, and completes the processes of FIG. 9. How to notify a user is not limited to a specific way, but the controller 130 may have the display 109 display a message or have a speaker (not shown) of the printer 10 sound out an audio message.

The situation in which the sensor 103 outputs the High-level signal corresponds to a situation in which the ink surface in the second ink chamber 36 lowers and the detection portion 93 moves out of the detection position. Therefore, there is still some amount of ink in the second ink chamber 36, but the amount is small.

After the controller 130 sets the near-empty flag to "ON" at step S32, the controller 130 counts an amount of ink ejected by the recording head 21 and stores the counted amount in the EEPROM 134 for each ink cartridge 30. When the ink cartridge 30 is removed from the cartridge mounting portion 110, the controller 130 clears the counted amount in the EEPROM.

If the near-empty flag is set to "ON" (step S31: Yes), the controller 130 compares the amount of ejected ink stored in the EEPROM 134 and a predetermined threshold value at step S34. If the amount of ejected ink is less than the threshold value (step S34: Yes), the controller 130 performs the process of step S33 and completes the processes of FIG. 9. If the amount of ejected ink is greater than or equal to the threshold value (step S34: No), the controller 130 sets the empty flag to "ON" at step S35. Subsequently, the controller 130 notifies a user that the ink cartridge 30 becomes empty at step S36, and completes the processes of FIG. 9. How to notify a user is not limited to a specific way, but the controller 130 may have the display 109 display a message or have a speaker (not shown) of the printer 10 sound out an audio message.

If the controller 130 receives an image-recording instruction when the empty flag to "ON," the controller 130 may not cause the printer 10 to perform printing.

[Advantages]

According to the above-described embodiment, the second ink chamber 36 does not store ink before the ink cartridge 30 is mounted to the cartridge mounting portion 110. Therefore, the formation of air bubbles in the second ink chamber 36 can be prevented. The movement of the movable member 90 is not hindered by air bubbles adhering to the float 92 and the inner surface of the second ink chamber 36.

Moreover, air bubbles formed in the first ink chamber 35 tend to accumulate in an upper portion of the first ink chamber 35. Because a portion of the first ink chamber 35 and a portion of the second ink chamber 36 are positioned above the communication path, there is a reduced likelihood that the air bubbles accumulating in the upper portion of the first ink chamber 35 flows into the second ink chamber 36 through the communication path.

According to the above-described embodiment, both of the communication path, i.e., the opening 64, the ink supply chamber 61, and the opening 65, and the ink supply path, i.e., the opening 63, the first space of the ink supply chamber 61, the opening 78, the inner space of the inner cylindrical member 76, the opening 79, and the second space of the ink supply chamber 61, are formed in the ink supply portion 60. Moreover, the communication path and the ink supply path are opened and closed by the movement of the inner cylindrical member 76. Therefore, the structure of the ink cartridge 30 can be simple with reduced number of elements. Nevertheless, in another embodiment, the communication path and the ink supply path may be formed independently.

Moreover, the communication path and the ink supply path may be opened and closed by a member different from the inner cylindrical member 76.

When the hollow tube 102 is removed from the ink supply chamber 61, the inner cylindrical member 76 moves from the second position back to the first position by the biasing force of the coil spring 82. Therefore, when the ink cartridge 30 is removed from the cartridge mounting portion 110, the communication path and the ink supply path are closed again, and ink leakage from the ink cartridge 30 can be reduced.

Figure 9:
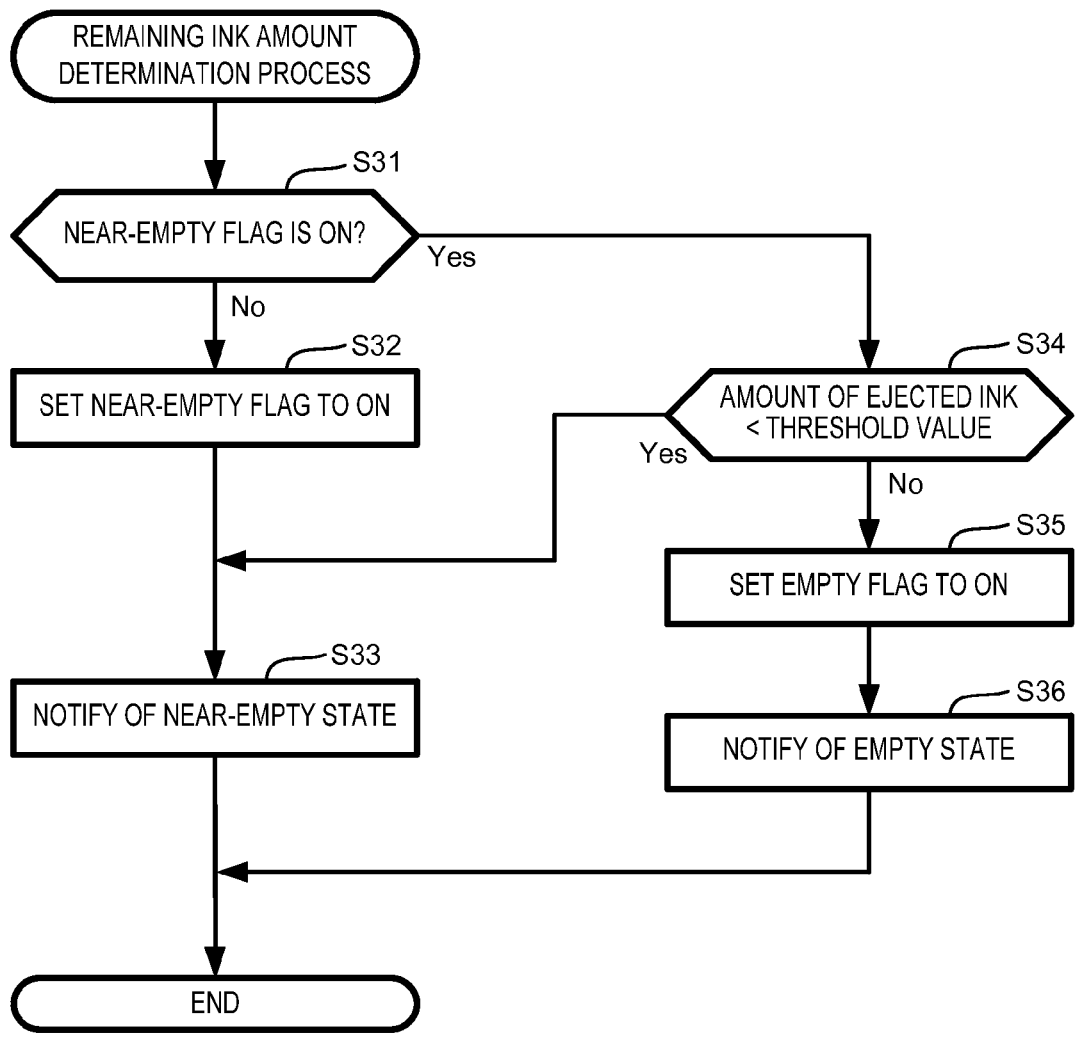
FIG. 9 is a flow chart of a remaining ink amount determination process performed by a controller.

According to the above-described embodiment, the controller 130 comprises the CPU 131 and the ASIC 135, but the controller 130 may not comprise the ASIC 135 and the CPU 131 may perform all the processes of FIG. 9 by reading out a program stored in the ROM 132. On the contrary, the controller 130 may not comprise the CPU 131, and may comprise hardware only, such as the ASIC 135 or FPGA. Moreover, the controller 130 may comprise a plurality of CPUs 131 and/or a plurality of ASICs 135.

Referring to FIGS. 10A to 11B, first and second modified embodiments are described. The descriptions of the parts which are common between the above-described embodiment and the first and second embodiments may be omitted, but the parts which are different from the parts of the other embodiments are described. Moreover, the parts of the above-described embodiment and the first and second modified embodiments can be arbitrarily combined as long as the object of the invention is achieved.

First Modified Embodiment

Figure 10A:
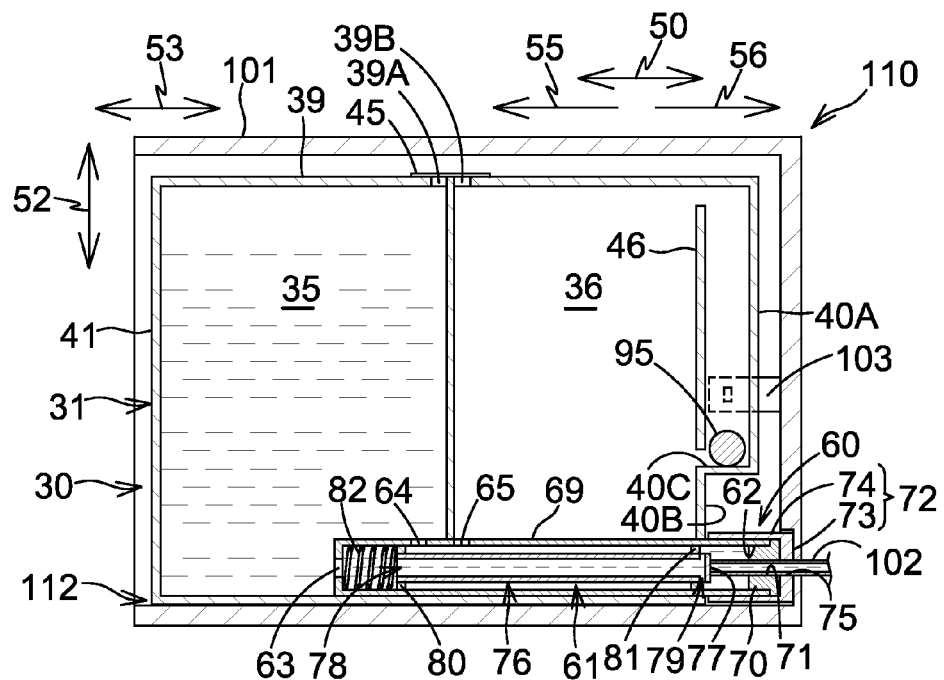
FIG. 10A is a cross-sectional view of an ink cartridge and a cartridge mounting portion according to a first modified embodiment when mounting of the ink cartridge to the cartridge mounting portion has been just completed.
Figure 10B:
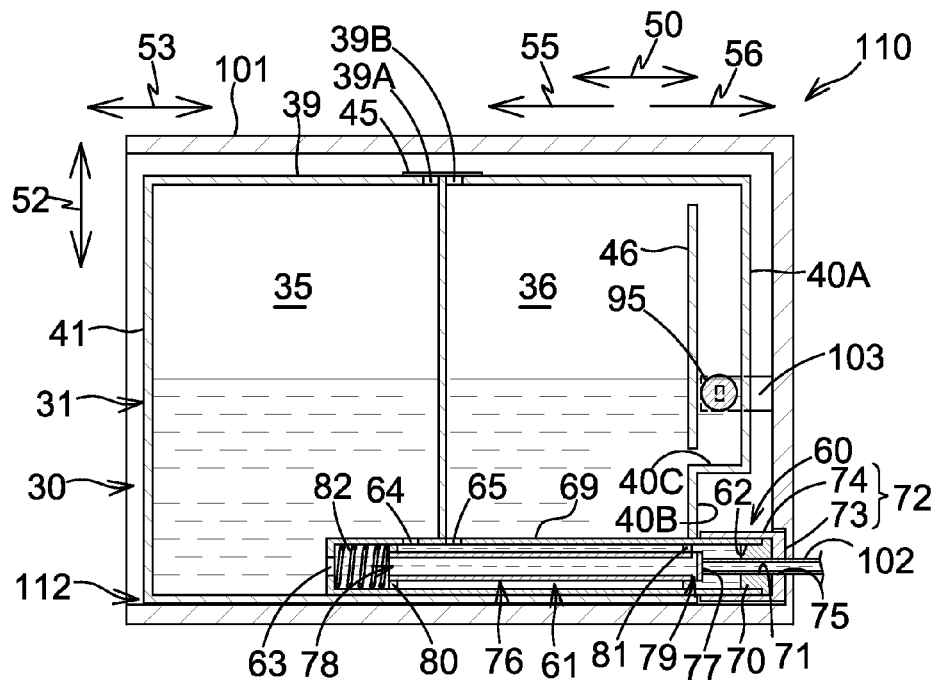
FIG. 10B is a cross-sectional view of the ink cartridge and the cartridge mounting portion according to the first modified embodiment when mounting of the ink cartridge to the cartridge mounting portion has been completed and a detection portion reaches a detection position.

Referring to FIGS. 10A and 10B, an ink cartridge 30 and a cartridge mounting portion 110 according to the first modified embodiment are described. The ink cartridge 30 comprises a guide wall 46 and a movable member 95 in the second ink chamber 36 instead of the movable member 90.

The guide wall 46 extends from the inner surface of the right wall 38 to the left wall 37 (the film 44) in the width direction 51. The guide wall 46 also extends in the height direction 52 from a position adjacent to the connecting wall 40C to a position adjacent to the top wall 39. The guide wall 46 faces the first wall 40A of the front wall 40 in the depth direction 53 and extends substantially in parallel with the first wall 40A.

In this first modified embodiment, the movable member 95, the detection portion, the float, and the light blocking portion are one and the same member. That is, the movable member (detection portion, float, light blocking portion) 95 has a specific gravity which is less than the specific gravity of ink. Moreover, the movable member (detection portion, float, light blocking portion) 95 blocks lights emitted by the light blocking portion of the sensor 103. The movable member (detection portion, float, light blocking portion) 95 is positioned between the first wall 45A and the guide wall 46. The gap between the connecting wall 40C and the guide wall 46 and the gap between the top wall 39 and the connecting wall 40C is less than the movable member (detection portion, float, light blocking portion) 95.

Referring to FIG. 10A, before ink flows into the second ink chamber 36, the movable member (detection portion, float, light blocking portion) 95 is out of the detection position. The sensor 103 outputs the High-level signal to the controller 130. Referring to FIG. 10B, as the ink surface in the second ink chamber 36 moves up, the movable member (detection portion, float, light blocking portion) 95 moves up between the guide wall 40 and the first wall 40A. When the movable member (detection portion, float, light blocking portion) 95 reaches the detection position where the movable member (detection portion, float, light blocking portion) 95 blocks the light of the sensor 103, the detection signal output from the sensor 103 changes from the High-level signal to the Low-level signal.

Subsequently, as the ink surface in the second ink chamber 36 lowers, the movable member (detection portion, float, light blocking portion) 95 moves down between the guide wall 46 and the first wall 40A. When the movable member (detection portion, float, light blocking portion) 95 moves out of the detection position, the detection signal output from the sensor 103 changes from the Low-level signal to the High-level signal. When the detection signal output from the sensor 103 changes from the Low-level signal to the High-level signal, the controller 130 sets the near-empty flag to "ON" at step S32, and notifies a user that the remaining ink amount in the ink cartridge 30 has become less than a threshold amount at step S33.

Second Modified Embodiment

Figure 11A:
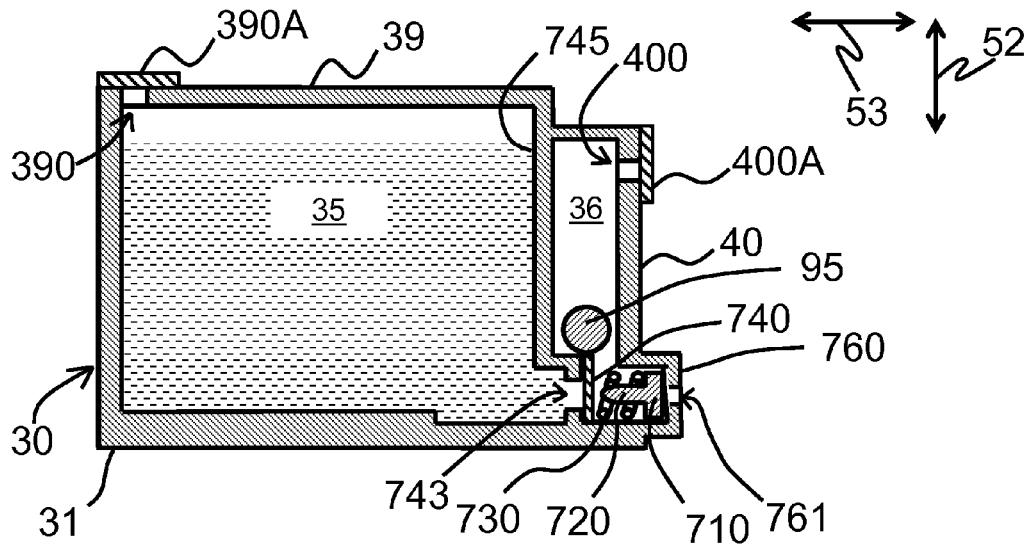
FIG. 11A is a cross-sectional view of an ink cartridge according to a second modified embodiment, in which a pointed member is in a standby position.
Figure 11B:
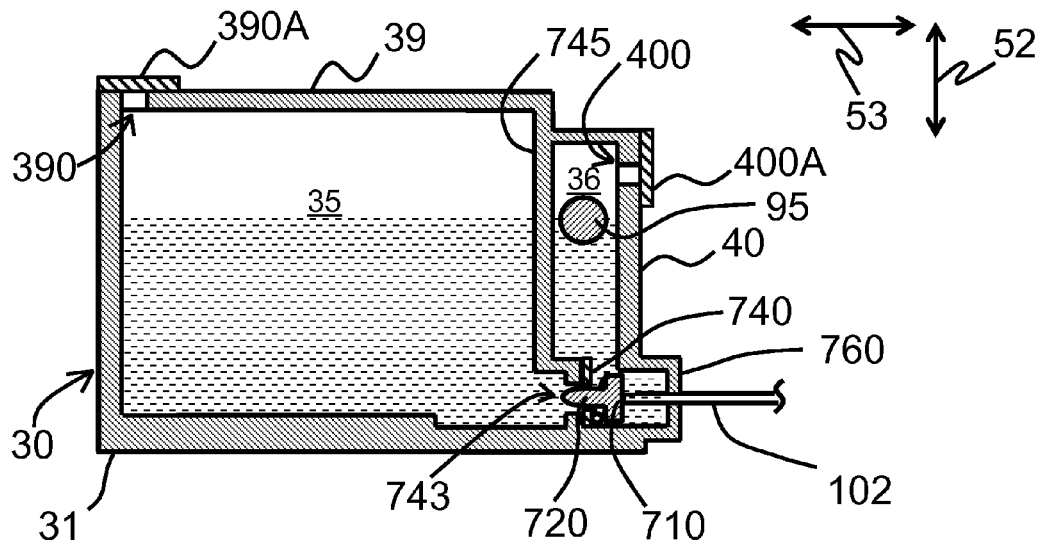
FIG. 11B is a cross-sectional view of the ink cartridge according to the second modified embodiment, in which the pointed member is in a rupture position.

Referring to FIGS. 11A and 11B, an ink cartridge 30 according to the second modified embodiment is described. The frame 31 comprises a partitioning wall 745 instead of the partitioning wall 43. The partitioning wall 745 has an opening 743 formed therethrough in the depth direction 53. The opening 743 functions as a communication path. The ink cartridge 30 comprises an ink supply portion 760 instead of the ink supply portion 60. The frame has an opening 400 and an opening 390 instead of the opening 39A and the opening 39B. The ink cartridge 30 comprises an air permeable film 390A and an air permeable film 400A instead of the air permeable film 45.

The ink supply portion 760 extends from the front outer face of the front wall 40 in the insertion direction 56. The ink supply portion 760 has a cylindrical shape. The ink supply portion 760 has a proximal end at the front wall 40 and a distal end opposite the proximal end. The ink supply portion 760 has a liquid supply opening, e.g., an ink supply opening 761 formed at the distal end. The ink supply opening 761 extends in the depth direction 53. The ink supply portion 760 has an inner space and the inner space can be in fluid communication with the exterior of the ink cartridge 30 via the ink supply opening 761. The inner space of the ink supply portion 760 is in fluid communication with the inner space of the frame 31, i.e., the second ink chamber 36, at the proximal-end side. The second ink chamber 36 can be in fluid communication with the exterior of the ink cartridge 30 via the ink supply portion 760.

The ink cartridge 30 comprises a valve member 710 which is movable between a close position as shown in FIG. 11A and an open position as shown in FIG. 11B in the depth direction 53. When the valve member 710 is in the close position, the valve member 710 contacts a wall surrounding the ink supply opening 761 and thereby closes the ink supply opening 761. When the valve member 710 is in the open position, the valve member 710 is positioned away from the wall surrounding the ink supply opening 761 and thereby opens the ink supply opening 761.

The ink cartridge 30 comprises a blocking member, e.g., a rupturable wall, e.g., a film 740 attached to the wall surrounding the opening 743 to close the opening 743. The ink supply opening 761 extends in the depth direction 53, and the ink supply opening 761 and the film 740 are aligned in the depth direction 53. The ink cartridge 30 comprises a biasing member, e.g., a coil spring 730 positioned between the wall surrounding the opening 743 and the valve member 710. The coil spring 730 biases the valve member 710 into the close position. The film 740 has a thickness in the depth direction 53, and the partitioning wall 745 has a thickness in the depth direction 53, and the thickness of the film 740 is less than the thickness of the partitioning wall 745.

The ink cartridge 30 comprises a pointed member 720 extending from the valve member 710 toward the film 740. The pointed member 720 is movable between a standby position as shown in FIG. 11A and a rupture position as shown in FIG. 11B. When the pointed member 720 moves from the standby position to the rupture position, the pointed member 720 penetrates and ruptures the film 740 so as to open the opening 743. When the valve member 710 is in the close position, the pointed member 720 is in the standby position. When the valve member 710 is in the open position, the pointed member 720 is in the rupture position.

The front wall 40 of the ink cartridge 30 has an opening 400 formed therethrough in the depth direction 53. The opening 400 is positioned closer to the upper end of the front wall 40 than to the lower end of the front wall 40. The ink cartridge 30 comprises an air permeable film 400A attached to the front outer face of the front wall 40 to cover the opening 400. The second ink chamber 36 is in air communication with the atmosphere outside the ink cartridge 30 via the opening 400 and the air permeable film 400A.

The top wall 39 of the ink cartridge 30 has an opening 390 formed therethrough in the height direction 52. The ink cartridge 30 comprises an air permeable film 390A attached to the top outer face of the top wall 39 to cover the opening 390. The first ink chamber 35 is in air communication with the atmosphere outside the ink cartridge 30 via the opening 390 and the air permeable film 390A.

The ink cartridge 30 comprises the same movable member (detection portion, float, light blocking portion) 95 as in the first modified embodiment.

Referring to FIG. 11B, when the hollow tube 102 is inserted through the ink supply opening 761, the hollow tube 102 contacts the valve member 710 and pushes the valve member 710 and the pointed member 720. When this occurs, the valve member 710 moves from the close position to the open position, and at the same time the pointed member 720 moves from the standby position to the rupture position. Ink flows from the first ink chamber 35 into the second ink chamber 36 through the opening 743 and flows into the hollow tube 102.

Referring to FIG. 11A, before the ink cartridge 30 is mounted to the cartridge mounting portion 110, i.e., when the movable member 710 is in the block position, the first ink chamber 35 stores ink therein and the second ink chamber 36 does not store ink therein. The ink surface in the first ink chamber 35 moves down and the ink surface in the second ink chamber 36 moves up as ink moves from the first ink chamber 35 to the second ink chamber 36 through the opening 743. The movable member (detection portion, float, light blocking portion) 95 moves up accordingly. Finally the height of the ink surface in the first ink chamber 35 and the height of the ink surface in the second ink chamber 36 becomes the same as shown in the FIG. 11B, and the movable member (detection portion, float, light blocking portion) 95 reaches the detection position.

The communication path, i.e., the opening 743 is positioned in a lower half portion of the ink cartridge 30. A portion of the first ink chamber 35 and a portion of the second ink chamber 36 are positioned in an upper half portion of the ink cartridge 30. Therefore, the portion of the first ink chamber 35 and the portion of the second ink chamber 36 are positioned above the communication path, i.e., the opening 743.

In the above-described embodiment and the first and second modified embodiments, ink is an example of liquid. Nevertheless, liquid is not limited to ink. For instance, liquid can be pre-treatment liquid which is ejected onto the sheet of paper before ink is ejected in printing.

While the invention has been described in connection with various example structures and illustrative embodiments, it will be understood by those skilled in the art that other variations and modifications of the structures and embodiments described above may be made without departing from the scope of the invention. Other structures and embodiments will be understood by those skilled in the art from a consideration of the specification or practice of the invention disclosed herein. It is intended that the specification and the described examples are merely illustrative and that the scope of the invention is defined by the following claims.

The invention claimed is:

1. A liquid cartridge comprising:
   a liquid chamber;
   a liquid supply portion providing selective liquid communication between an interior of the liquid chamber and an exterior of the liquid chamber;
   a partitioning wall partitioning the liquid chamber into a first liquid chamber and a second liquid chamber;
   a communication path providing selective liquid communication between the first liquid chamber and the second liquid chamber;
   a blocking member having a block position in which liquid is prevented from flowing from the first liquid chamber to the second liquid chamber through the communication path, such that liquid is stored in the first liquid chamber and not stored in the second liquid chamber, wherein the liquid has a first specific gravity; and
   a first movable member positioned in the second liquid chamber and comprising a float, wherein the float has a second specific gravity which is less than the first specific gravity, and the float moves in response to the level of liquid in the second chamber when liquid flows from the first liquid chamber to the second liquid chamber.

2. The liquid cartridge of claim 1, wherein the blocking member is a second movable member which is movable between the block position and a communication position, wherein when the second movable member is in the communication position, the liquid is allowed to flow from the first liquid chamber to the second liquid chamber through the communication path.

3. The liquid cartridge of claim 2, wherein the liquid supply portion has a liquid supply opening extending in a first direction, wherein the liquid supply opening and the second movable member are aligned in the first direction.

4. The liquid cartridge of claim 2, further comprising a valve member which is movable between a close position and an open position, wherein the liquid supply portion has a liquid supply opening, wherein when the valve member is in the close position, the valve member is configured to close the liquid supply opening, and when the valve member is in the open position, the valve member is configured to open the liquid supply opening, wherein when the valve member is in the close position, the second movable member is in the block position, and when the valve member is in the open position, the second movable member is in the communication position.

5. The liquid cartridge of claim 4, wherein the second movable member is connected to the valve member.

6. The liquid cartridge of claim 2, wherein the liquid chamber is positioned between a first outer face and a second outer face, the liquid supply portion being positioned at the first outer face, and wherein the communication position is closer to the second outer face than the block position is.

7. The liquid cartridge of claim 2, wherein the first movable member is configured to pivot about a pivot axis in the second liquid chamber.

8. The liquid cartridge of claim 1, wherein the partitioning wall has a first thickness, and the blocking member is a rupturable wall closing the communication path, wherein the rupturable wall has a second thickness which is less than the first thickness.

9. The liquid cartridge of claim 8, wherein the liquid supply portion has a liquid supply opening extending in a first direction, wherein the liquid supply opening and the rupturable wall are aligned in the first direction.

10. The liquid cartridge of claim 9, further comprising a pointed member which is movable between a standby position and a rupture position, wherein the pointed member is configured to penetrate and rupture the rupturable wall so as to open the communication path when the pointed member moves from the standby position to the rupture position.

11. The liquid cartridge of claim 10, further comprising a valve member which is movable between a close position and an open position, wherein the liquid supply portion has a liquid supply opening, wherein when the valve member is in the close position, the valve member is configured to close the liquid supply opening, and when the valve member is in the open position, the valve member is configured to open the liquid supply opening, wherein when the valve member is in the close position, the pointed member is in the standby position, and when the valve member is in the open position, the pointed member is in the rupture position.

12. The liquid cartridge of claim 11, wherein the pointed member is connected to the valve member.

13. The liquid cartridge of claim 1, wherein a portion of the first liquid chamber and a portion of the second liquid chamber are positioned above the communication path.

14. The liquid cartridge of claim 1, wherein the communication path is positioned in a lower half portion of the liquid cartridge, and the portion of the first liquid chamber and the portion of the second liquid chamber are positioned in an upper half portion of the liquid cartridge.

15. The liquid cartridge of claim 1, further comprising a communication member having a first opening in liquid communication with the first liquid chamber and a second opening in liquid communication with the second liquid chamber that define the communication path, and wherein the blocking member is received in the communication member.

16. The liquid cartridge of claim 15, wherein the communication member comprises an outer cylindrical member, and the blocking member comprises an inner cylindrical member that is slidably received in the outer cylindrical member.

* * * * *